(12) United States Patent
Bielski et al.

(10) Patent No.: US 9,140,580 B2
(45) Date of Patent: Sep. 22, 2015

(54) METHOD AND APPARATUS FOR ANGLE MEASUREMENT

(75) Inventors: Steffen Bielski, Garching (DE); Erich Strasser, Trostberg (DE); Stephan Kreuzer, Surberg-Ettendorf (DE); Alexander Kobler, Burgkirchen (DE); Darko Perusin, Traunreut (DE); Elmar Mayer, Nußdorf (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 518 days.

(21) Appl. No.: 13/559,890

(22) Filed: Jul. 27, 2012

(65) Prior Publication Data

US 2013/0030756 A1    Jan. 31, 2013

(30) Foreign Application Priority Data

Jul. 28, 2011 (DE) .................. 10 2011 079 961

(51) Int. Cl.
*G01C 9/00* (2006.01)
*G01D 5/244* (2006.01)
*G06F 11/30* (2006.01)

(52) U.S. Cl.
CPC ................................ *G01D 5/24471* (2013.01)

(58) Field of Classification Search
CPC ......................... G06F 13/36; G01D 5/24471
See application file for complete search history.

(56) References Cited

U.S. PATENT DOCUMENTS

| | | | |
|---|---|---|---|
| 6,410,910 B1 * | 6/2002 | Feichtinger | 250/231.13 |
| 6,591,220 B1 * | 7/2003 | Rodi | 702/158 |
| 2009/0072130 A1 * | 3/2009 | Chase et al. | 250/231.14 |

FOREIGN PATENT DOCUMENTS

| | | |
|---|---|---|
| DE | 199 07 326 A1 | 8/2000 |
| EP | 1 102 039 A1 | 5/2001 |
| EP | 1 217 333 A2 | 6/2002 |
| EP | 2 144 041 A2 | 1/2010 |
| WO | WO 2007/083118 A1 | 7/2007 |

OTHER PUBLICATIONS

Ernst, A., "Digitale Längen—und Winkelmesstechnik," published by the Verlag Moderne Industrie, 3rd edition, 1998, pp. 61-70.
Ernst, A., Digital Linear and Angular Metrology, published by the Verlag Moderne Industrie, 3rd edition, 1998, pp. 61-70.
Search Report regarding corresponding European patent application 12 16 5440.

* cited by examiner

*Primary Examiner* — Phuong Huynh
(74) *Attorney, Agent, or Firm* — Brinks Gilson & Lione

(57) ABSTRACT

An apparatus for angle measurement that includes a graduation carrier with a code track disposed concentrically to a center point of the graduation carrier. The apparatus includes a first scanning unit having a first interface and a second scanning unit having a second interface, wherein the first and second scanning units ascertain angle values of the graduation carrier by scanning the code track. The apparatus further includes a control unit having: 1) a device interface that is in communication with a follower electronics unit, 2) a control unit interface that is in communication with the first and second interfaces and 3) a processing unit. By which the processing unit, angle values of the first and second scanning units can be requested and processed into a corrected angle value, and the corrected angle value can be transmitted to the follower electronics unit via the device interface.

17 Claims, 4 Drawing Sheets

METHOD AND APPARATUS FOR ANGLE MEASUREMENT

RELATED APPLICATIONS

Applicants claim, under 35 U.S.C. §119, the benefit of priority of the filing date of Jul. 28, 2011 of a German patent application, copy attached, Serial Number 10 2011 079 961.3, filed on the aforementioned date, the entire contents of which is incorporated herein by reference.

BACKGROUND

1. Technical Field

The present invention relates to an apparatus for angle measurement, and to a method for angle measurement. An apparatus and a method according to the present invention for angle measurement can decisively improve the accuracy in the measurement of the angular position of shafts with large diameters, in both rotary tables and telescopic applications.

2. Background Information

High-precision angle measurement devices for measuring the angular position of a shaft, such as a shaft of a rotary table, are known. Variants that are self-supported and have a shaft on the end toward the measuring system are described in the book entitled "Digitale Längen-und Winkelmesstechnik" [Digital Length and Angle Measurement Technology] by A. Ernst, published by the Verlag Moderne Industrie, $3^{rd}$ edition, 1998, pp. 61-64. To achieve high accuracy, first, highly accurate and hence very expensive precision bearings must be used in the measuring system. Second, connecting the measuring system shaft, which has a graduation plate with a radial measurement graduation, by a suitable coupling to the shaft that is to be measured requires major effort and expense.

Also, from pages 64-70 of the above mentioned book, angle measurement devices without self-support are known, in which a rotationally symmetrical measurement graduation or a corresponding graduation plate is disposed directly on a shaft that is to be measured. Corresponding scanning units for scanning the measurement graduation are disposed in stationary fashion relative to the rotating graduation plate.

In these angle measurement devices, incremental graduations with up to 36,000 radial lines are used as a measurement graduation, which further increases the angular resolution by interpolation.

In the ideal case, the accuracy of the angle measurement in such angle measurement devices depends on both the precision with which the measurement graduation was applied to the graduation plate, and on the measurement error of the scanning unit. In reality, due to manufacturing tolerances, the rotary motion of the graduation plate and, thus, of the measurement graduation, always has both an error in eccentricity and an error in wobble. This is due to the fact that: 1) the center point of the graduation plate can never lie exactly on the axis of rotation of the shaft to be measured, and 2) the axes of rotation of the graduation plate and of the shaft to be measured can never be disposed in exact alignment. As a consequence, the spacing and position of the measurement graduation relative to the scanning unit vary within one revolution of the shaft to be measured, resulting in a measurement error in the angle measurement.

To reduce the high expense for 1) precision bearings and precision couplings, especially in large angle measurement devices for shafts of large diameters, and 2) the mechanical calibration, German patent disclosure DE 199 07 326 A1 of the present Applicant proposes scanning the measurement graduation at a plurality of scanning points distributed over the circumference of the graduation plate, and evaluating the resultant sinusoidal signals and correcting errors in eccentricity and wobble.

Modern angle measurement devices, though, preferably use an absolutely coded code track instead of the incremental track. This code track is, for example, a multi-track code, such as a gray code, or a single-track incremental code, known as a "pseudo-random code" (PRC). This has the advantage that at every moment the absolute angle position can be determined directly by scanning the code track. However, the signal processing proposed in DE 199 07 326 A1 cannot be used for absolutely coded code tracks.

OBJECTS AND SUMMARY OF THE INVENTION

It is therefore an object of the present invention to disclose an absolute angle measurement device with improved accuracy.

This object is attained by an apparatus for angle measurement, wherein the apparatus includes a graduation carrier that has a code track disposed concentrically to a center point of the graduation carrier. The apparatus includes a first scanning unit that has a first interface and a second scanning unit that has a second interface, wherein the first and second scanning units ascertain angle values of the graduation carrier by scanning the code track. The apparatus further includes a control unit having: 1) a device interface that is in communication with a follower electronics unit, 2) a control unit interface that is in communication with the first and second interfaces and 3) a processing unit. By which the processing unit, via the control unit interface and a request for angle values, angle values of the first and second scanning units can be requested and processed into a corrected angle value, and the corrected angle value can be transmitted to the follower electronics unit via the device interface.

An apparatus for angle measurement in the form of an angle measurement device is now proposed, including
- a graduation carrier, which has a code track disposed concentrically to its center point;
- at least two scanning units for ascertaining angle values of the graduation carrier by scanning the code track;
- a control unit, having a device interface for communication with a follower electronics unit and having at least one interface for communication with interfaces of the scanning units;

in which the control unit includes a processing unit, by which via the at least one interface angle value of the scanning units can be requested and processed into a corrected angle value, and the corrected angle value can be transmitted to the follower electronics unit via the device interface.

It is a further object of the present invention to disclose a method with which the accuracy of this kind of absolute angle measurement device can be improved.

This object is attained by a method for angle measurement having an apparatus for angle measurement that includes a graduation carrier that has a code track disposed concentrically to a center point of the graduation carrier. The apparatus includes a first scanning unit that has a first interface and a second scanning unit that has a second interface, wherein the first and second scanning units ascertain angle values of the graduation carrier by scanning the code track. The apparatus further includes a control unit having: 1) a device interface that is in communication with a follower electronics unit, 2) a control unit interface that is in communication with the first and second interfaces and 3) a processing unit. By which the processing unit, via the control unit interface and a request for angle values, angle values of the first and second scanning units can be requested and processed into a corrected angle value, and the corrected angle value can be transmitted to the follower electronics unit via the device interface. The method includes requesting, via a request of angle values, angle values from the first and second scanning units and processing, via the processing unit, the angle values into the corrected angle value. The method further includes transmitting the corrected angle value to the follower electronics unit.

A method for angle measurement having an apparatus for angle measurement is now proposed, having the following processes:

requesting angle values from at least two scanning units of the apparatus;
processing the angle values into a corrected angle value via a processing unit of the apparatus; and
transmitting the corrected angle value to a follower electronics unit of the apparatus.

Further advantages and details of the present invention will become apparent from the ensuing description in conjunction with the drawings.

In the drawings:

DETAILED DESCRIPTION OF THE PREFERRED EMBODIMENTS

Figure 1:
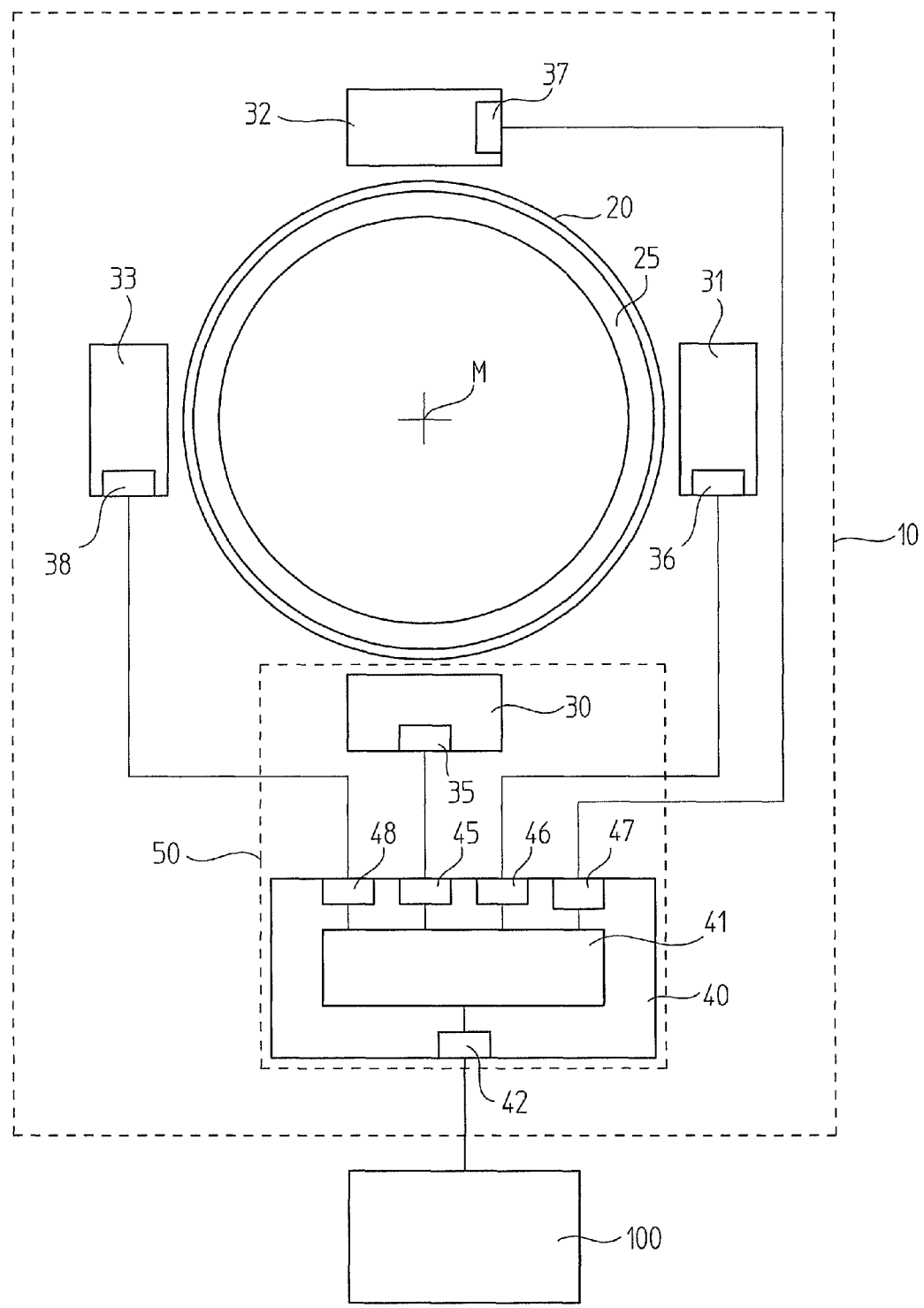
FIG. 1 is a block diagram of a first exemplary embodiment of an angle measurement device in accordance with the present invention.

FIG. 1 shows a block diagram of a first exemplary embodiment of an angle measurement device 10 of the present invention. The angle measurement device 10 includes as a graduation carrier a circular or annular code disk 20, and the code disk has a code track 25, disposed radially around the center point of the code disk 20. In addition, the angle measurement device 10 includes four scanning units 30, 31, 32, 33 and a control unit 40.

For the operation of the angle measurement device 10, the coded disk 20 is connected in a manner fixed against relative rotation to a shaft that is to be measured, so that it rotates about its center point M together with the axis of rotation of the shaft to be measured. The code disk 20 has a code track 25 that is capable of being scanned photoelectrically, magnetically, capacitively, or inductively. According to the present invention, the code track 25 includes an absolute coded graduation, for instance in the form of a multi-track code (such as a gray code), or a single-track incremental code (pseudo-random code or PRC). To increase the resolution of the angle measurement device 10, a further track with an incremental graduation (not shown) can additionally be disposed parallel to the absolute encoded graduation.

As described at the outset above, because of unavoidable tolerances involved in mechanically connecting the shaft to be measured to the code disk 20, errors of eccentricity and wobble occur. This is true both for angle measurement devices 10 without self-support, in which the code disk 20 is disposed directly on the shaft that is to be measured. It is also true for self-supported angle measurement devices 10 that themselves include a shaft on which the code disk 20 is secured in a manner fixed against relative rotation and wherein such shaft is in turn connected via a shaft coupling to the shaft that is to be measured.

The scanning units 30, 31, 32, 33 are suitably embodied for scanning the code track 25 and for ascertaining absolute angle values of the code disk 20, and, thus, of the shaft to be measured, from the scanning signals. The physical scanning principle is not of significance for the present invention. In the present example, the scanning units 30, 31, 32, 33 are disposed in stationary fashion, distributed at defined angular spacings over the circumference of the code disk 20. For instance, the angular spacing between each of the scanning units 30, 31, 32, 33 is 90°. In ascertaining the corrected angle value, the offset that results in the ascertaining of the absolute angle values of the scanning units 30, 31, 32, 33 can be taken into account either in the scanning units 30, 31, 32, 33 or the control unit 40.

Although in the exemplary embodiment in FIG. 1 four scanning units 30-33 are used, the present invention is not fixed at that number. What is important for ascertaining the corrected angle value is that there are at least two scanning units.

For outputting the absolute angle values, the scanning units 30, 32, 32, 33 have digital interfaces 35, 36, 37, 38. Both parallel interfaces, with preferred data widths of 4 bits (one nibble), 8 bits (one byte), or 16 bits (one word), and serial interfaces can be used. Especially suitable serial interfaces are known standard interfaces for position measuring devices, such as EnDat or SSI. However, field bus systems (such as CAN bus, Interbus-S, or SERCOS) or interfaces that can be summarized by the term "real-time ethernet" can also be used as interfaces 35-38. Accordingly, the interface connections, as shown in FIG. 1, can be either point-to-point connections or bus connections with a linear or annular structure.

For the communication between the control unit 40 and the scanning units 30-33, interfaces 45-48 are provided in the control unit 40, which are connected to the interfaces 35-38 of the scanning units 30-33 via suitable signal lines. The signal lines can be conventional electrical lines, but when there are great spatial distances between the control unit 40 and the scanning units 30-33, it can be advantageous to use optical waveguides as the signal lines and optical interfaces for both the interfaces 45-48 of the control unit 40 and the interfaces 35-38 of the scanning units 30-33. The absolute angle values, which are ascertained in the scanning units 30-33, can now be transmitted to the control unit 40 via the interface connections inside the devices.

For communication with a follower electronics unit 100, the control unit 40 further includes a device interface 42. This interface is advantageously also a serial data transmission interface; prominent examples for this are again EnDat, SSI, or real-time ethernet interfaces.

A processing unit 41 is also provided in the control unit 40. It serves to request angle values from the scanning units 30-33 via the corresponding interface connections, for forming a corrected angle value using the requested angle values, and to transmit the corrected angle value to the follower electronics unit 100 via the device interface 42.

The processing unit 41 can moreover check the angle values arriving from the scanning units 30-33 for plausibility. If deviations that exceed a fixed tolerance threshold are found, the processing unit 41 can send a warning or error report to the follower electronics unit 100 via the device interface 42.

For security-relevant applications, it is advantageous to design the processing unit 41 such that at least two corrected angle values, which are based on the angle values from various scanning units 30-33, can be generated and transmitted to the follower electronics unit 100. In this way, by comparison in the follower electronics unit 100, errors in the generation or transmission of the corrected angle values can reliably be discovered.

Particularly in very large angle measurement devices 10, in which the code disk 20, the scanning units 30-33, and the control unit 40 cannot be disposed together in one housing, but instead are installed separately as individual components, it is advantageous to combine the control unit 40 and one of the scanning units 30-33 (in FIG. 1, the scanning unit 30) into a master scanning unit 50. By this, the assembly of the angle measurement device 10 can be made easier on the one hand, and, on the other hand, the interface connection of the corresponding interfaces 35, 45 can be embodied more simply.

A particular advantage of an angle measurement device 10 of the present invention is that from the standpoint of the follower electronics unit 100 with regard to communication with the device interface 42, no difference from communication with an angle measurement device of the kind known from the prior art is apparent, yet substantially improved measurement accuracy is nevertheless attained. Thus, even existing systems can be retrofitted with an angle measurement device 10 of the present invention and can achieve improved accuracy without having to make changes in the follower electronics unit 100.

Figure 2:
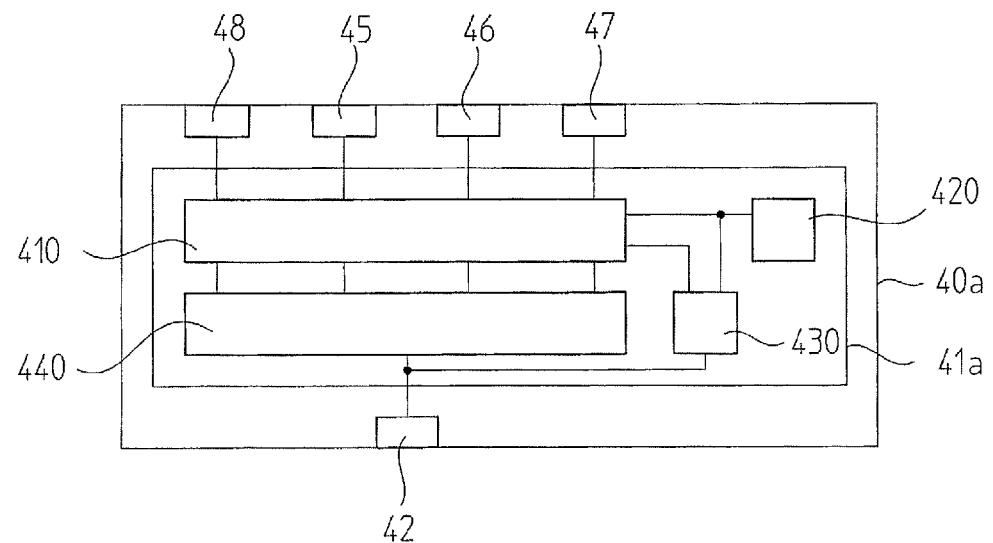
FIG. 2 is a block diagram of a first embodiment of a control unit to be used with the angle measurement device of FIG. 1 in accordance with the present invention.

FIG. 2 shows a block diagram of a control unit 40a that can be used in the angle measurement device 10 of FIG. 1 in accordance with the present invention. Function blocks that have already described in conjunction with FIG. 1 are identified by the same reference numerals.

For ascertaining the corrected angle value, the processing unit 41a includes an extrapolation unit 410, a clock generator 420, a time measuring unit 430, and a correction unit 440.

At time intervals which are determined by the clock signal of the clock generator 420, the extrapolation unit 410 requests actual angle values from the scanning units 30-33 via the interfaces 45-48. If a positioning request command arrives from the follower electronics unit 100 via the device interface 42, then the extrapolation unit 410 ascertains extrapolated angle values from the at least two most up-to-date angle values of each scanning unit 30-33. The time required for the extrapolation between the request for the latest angle value per scanning unit 30-33 and the time when the positioning request command arrives is measured by the time measuring unit 430. The extrapolated angle values are delivered to the correction unit 440, which processes them into the corrected angle value, for instance by finding the average of the extrapolated angle values. This corrected angle value is output to the follower electronics unit 100 via the device interface 42.

Figure 3:
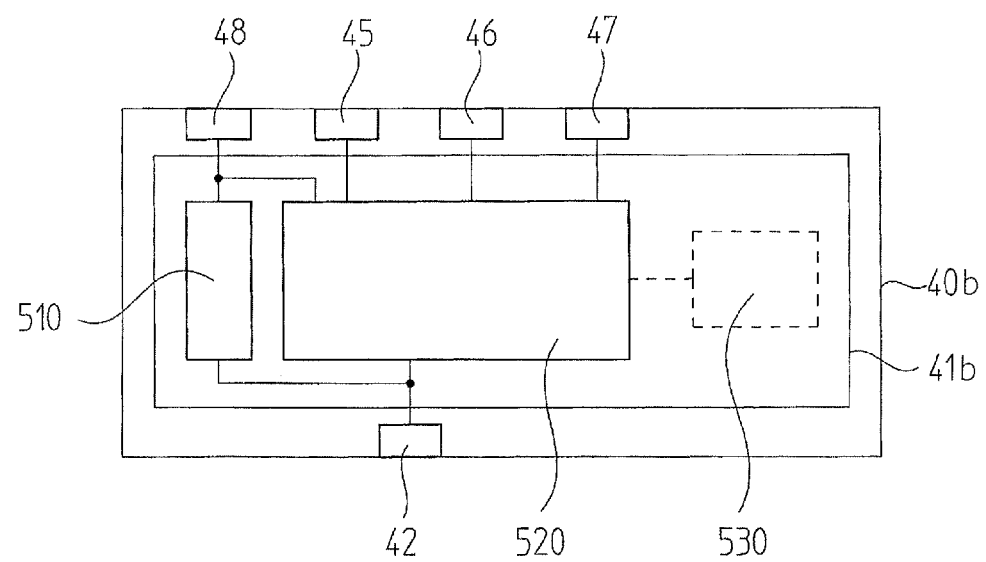
FIG. 3 is a block diagram of a second embodiment of a control unit to be used with the angle measurement device of FIG. 1 in accordance with the present invention.

FIG. 3 shows a block diagram of a control unit 40b that can be used with the angle measurement device 10 of FIG. 1 in accordance with the present invention. Once again, function blocks that have already described in conjunction with FIG. 1 are identified by the same reference numerals.

In this exemplary embodiment, the processing unit 41b includes a correction unit 510 and a correction value ascertaining unit 520. Optionally, the processing unit 41b can also contain a clock generator 530.

If a positioning request command arrives at the control unit 40b from the follower electronics unit 100, the correction value ascertaining unit 520, via the interfaces 45-48, requests actual angle values from the scanning units 30-33 and ascertains a correction value which is suitable for correcting the actual angle value arriving from a leading scanning unit 33. For that purpose, the correction value ascertaining unit 520 is advantageously designed such that the request for actual angle values is made with the least possible time lag and simultaneously for all the scanning units 30-33. The ascertained correction value is delivered to the correction unit 510, which corrects the actual angle value arriving from the leading scanning unit 33 and outputs it to the follower electronics unit 100 via the device interface 42.

With regard to the reaction time of the angle measurement device 10, or, in other words, the time between the arrival of the positioning request command and the outputting of the actual corrected angle value, it is advantageous if, as the correction value is forwarded to the correction unit 510 for ascertaining the corrected angle value, the correction value ascertained upon arrival of the previous positioning request command is used, rather than the correction value ascertained from the angle values arriving at the time. The reason this can be done is that the errors of eccentricity and wobble are long-period errors; that is, at small changes in angle, the correction value varies only insignificantly. Moreover, angle measurement device 10 is typically requested cyclically at short time intervals, or, in other words, with a high request frequency when the follower electronics 100 is in operation. In this way, especially when the shaft to be measured is rotating at a slow rpm, or at a high request frequency of the follower electronics unit 110, an improved reaction time can be attained without a significant reduction in the measurement accuracy, since at the moment the positioning request command arrives the correction value is already available.

In a further improvement for this purpose, the request of actual angle values from the scanning units 30-33 and the ascertainment of correction values in the correction value ascertaining unit 520 can be controlled by the optional clock generator 530. As a result, it is ensured that new correction values are ascertained continuously, and, therefore, upon arrival of a positioning request command, very up-to-date correction values are always already available.

To avoid chronologically overlapping arrivals of requests of actual angle values in the leading scanning unit 33 that are controlled internally by the clock generator 530 and externally via the device interface 42, the leading scanning unit 33 can be excluded from the ascertainment of new correction values. In that case, new correction values are ascertained using only angle values from the remaining scanning units 30-32.

Figure 4:
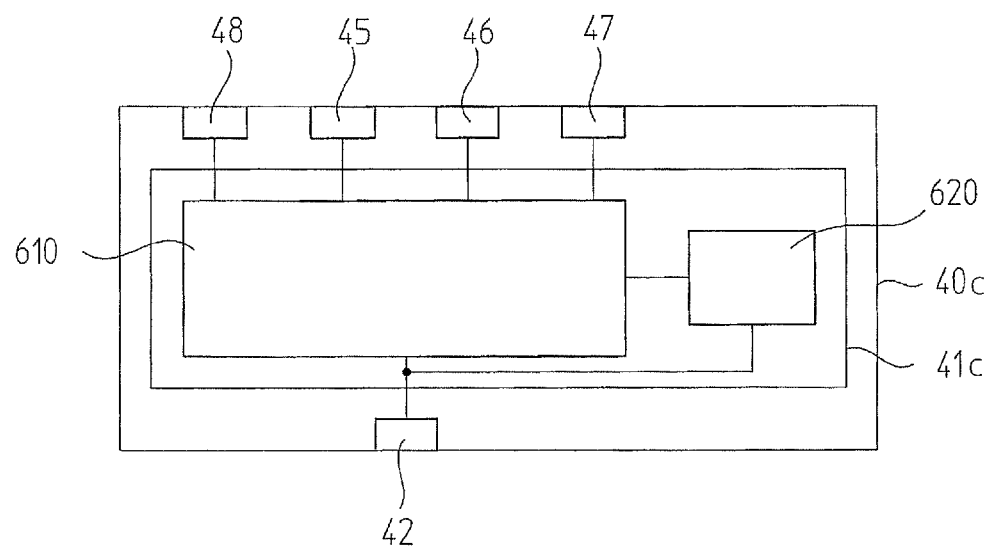
FIG. 4 is a block diagram of a third embodiment of a control unit to be used with the angle measurement device of FIG. 1 in accordance with the present invention.

FIG. 4 shows a block diagram of a control unit 40c to be used with the angle measurement device 10 of FIG. 1 in accordance with the present invention. Once again, function blocks that have already described in conjunction with FIG. 1 are identified by the same reference numerals.

This embodiment is based on the recognition that in cyclical operation of the angle measurement device 10, the interval of time between the arrival of positioning request commands from the follower electronics unit 100 via the device interface 42 is known. In addition to the correction unit 610, a trigger unit 620 is now provided, which controls both the requesting of new angle values from the scanning units 30-33 and the ascertainment of corrected angle values. To that end, the trigger unit 620 sends trigger signals to the correction unit 610. The timing of the trigger signals is structured such that the trigger signals are generated a predetermined time after the latest arrival of a positioning request command from the follower electronics unit 100, but still before the arrival of an actual positioning request command. As a consequence, in cyclical operation an actual corrected angle value can be sent to the follower electronics unit 100 immediately in response to a positioning request command. The information about when the trigger unit 620 has to send a trigger signal to the correction unit 610 can be imparted to the trigger unit 620, for instance, via the device interface 42.

Figure 5:
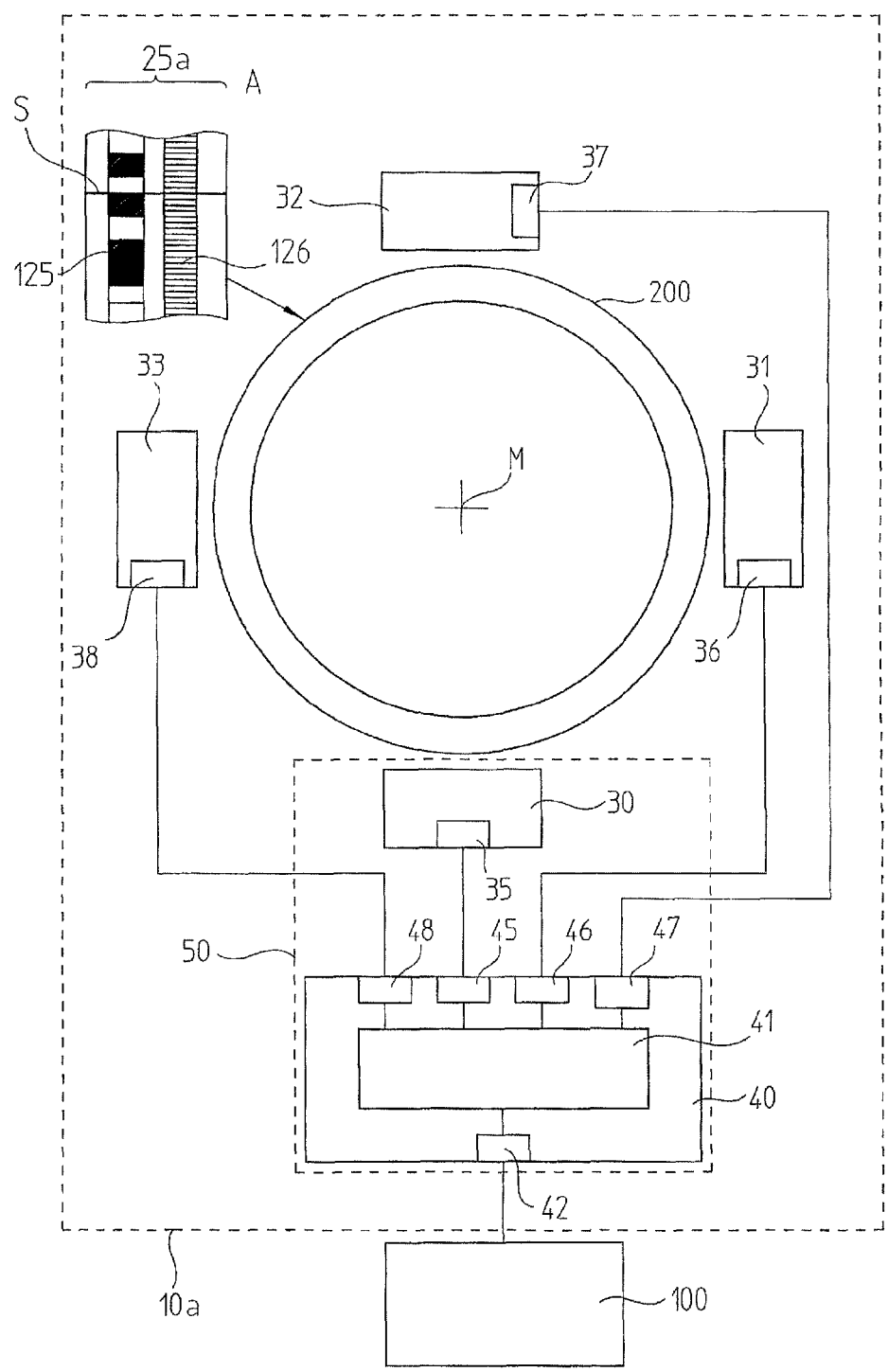
FIG. 5 is a block diagram of a further exemplary embodiment of an angle measurement device in accordance with the present invention.

FIG. 5 shows a block diagram of a further exemplary embodiment of an angle measurement device 10a of the present invention. In a departure from the exemplary embodiment of FIG. 1, the angle measurement device 10a includes as a graduation carrier a ring 200, on the cylindrical outer surface of which a code track 25a is disposed. In this exemplary embodiment, the code track 25a includes an absolute coded graduation 125 as well as an incremental graduation 126. The ring 200 is made from steel, for example, and in professional circles it is also known as a "drum." Advantageously, the lengths of the lines of the graduation tracks 125, 126 as measured transversely to the measurement direction are embodied such that they are greater than the scanning length required by the scanning units 30-33, so that axial displacements of the ring 200 relative to the scanning units 30-33 do not cause any incorrect measurement values.

Especially when the outer dimensions of the ring 200 are large, the absolutely coded graduation 125 and the incremental graduation 126 are not applied directly to the ring 200. Instead, the graduations 125 and 126 are in the form of a steel band that carries the graduation tracks 125, 126 and is placed in a groove located in the outer diameter of the ring and is fastened with a turnbuckle. In principle, as shown in detail A of FIG. 5, this creates a transition point S. As a scanning unit 30-33 passes over the transition point S, an abrupt change in the angle value that is read out can occur. To minimize its effect on the formation of the corrected angle value, it is advantageous if the processing unit 41 blanks out angle values from scanning units 30-33 which are located in the vicinity of the transition point S and does not use them for ascertaining the corrected angle value.

It should also be pointed out that in the implementation of the control unit 40, particularly in the exemplary embodiments described in conjunction with FIGS. 2-4, it is not absolutely necessary, for ascertaining the correction values, to transmit the angle values from all the scanning units 30-33 in their entirety to the control unit 40. Deviations in the angle values that are caused by wobble errors and errors of eccentricity move within a relatively narrow range of values. It is therefore usually sufficient to transmit only the actual angle value from a leading scanning unit 30-33 in its entirety. For the correction thereof to transmit only as many of the less significant bits of the remaining scanning units 30-33 as needed so that a maximum error can be reliably corrected.

In general, it is advantageous if the control unit 40 is designed such that the scanning units 30-33 can be addressed by the follower electronics 100 via the interface 42 individually as well. To that end, interface commands can, for instance, be provided that make it possible to select, describe, or read out individual scanning units 30-33. Fundamentally, however, still other selection and switchover mechanisms are also possible.

It is also advantageous to embody the control unit 40 such that individual scanning units 30-33 are deactivatable, or that their angle values are not taken into account in ascertaining the corrected angle value. In that case, the angle measurement device 10 can continue to be operated, with reduced accuracy, even if one scanning unit 30-33 fails or furnishes erroneous values. Particularly in connection with the exemplary embodiment of a control unit 40 described in conjunction with FIG. 3, it is advantageous to embody the leading scanning unit 33 in selectable fashion.

The foregoing description is provided to illustrate the present invention, and is not to be construed as a limitation. Numerous additions, substitutions and other changes can be made to the present invention without departing from its scope as set forth in the appended claims.

We claim:

1. An apparatus for angle measurement in the form of an angle measurement device, the apparatus comprising:
   a graduation carrier comprising a code track disposed concentrically to a center point of said graduation carrier;
   a first scanning unit comprising a first interface;
   a second scanning unit comprising a second interface, wherein said first scanning unit and said second scanning unit ascertain angle values of said graduation carrier by scanning said code track; and
   a control unit comprising:
      a device interface that is in communication with a follower electronics unit;
      a control unit interface that is in communication with said first interface and said second interface; and
      a processing unit by which, via said control unit interface and a request for angle values, angle values of said first scanning unit and said second scanning unit can be requested and processed into a corrected angle value, and said corrected angle value can be transmitted to said follower electronics unit via said device interface.

2. The apparatus according to claim 1, wherein said request for angle values can be initiated by positioning request commands which arrive at said device interface from said follower electronics unit.

3. The apparatus according to claim 1, wherein said processing unit further comprises a clock generator, and said request for angle values is controllable by said clock generator.

4. The apparatus according to claim 3, wherein said processing unit further comprises:
   a time measuring unit, with which a time between a most recent request for angle values until an arrival of a positioning request command can be measured at said device interface;
   an extrapolation unit, with which after the arrival of a positioning request command, extrapolated angle values can be calculated; and
   a correction unit, which processes said extrapolated angle values into said corrected angle value.

5. The apparatus according to claim 2, wherein said processing unit further comprises:
   a correction value ascertaining unit for ascertaining a correction value from said angle values; and
   a correction unit, with which said corrected angle value can be calculated from an actual angle value from said first scanning unit and said correction value.

6. The apparatus according to claim 3, wherein said processing unit further comprises:
   a correction value ascertaining unit for ascertaining a correction value from said angle values; and
   a correction unit, with which said corrected angle value can be calculated from an actual angle value from said first scanning unit and said correction value.

7. The apparatus according to claim 1, wherein said processing unit comprises:
a trigger unit; and
a correction unit, wherein said trigger unit is designed to transmit a trigger signal to said correction unit even before arrival of a positioning request command, and after arrival of said trigger signal, actual angle values can be requested by said correction unit, and said corrected angle value can be generated.

8. The apparatus according to claim 1, wherein said first scanning unit and said control unit are combined into a master scanning unit.

9. The apparatus according to claim 1, wherein said code track comprises an absolutely coded graduation and an incremental graduation.

10. A method for angle measurement, comprising:
providing an apparatus for angle measurement comprising:
a graduation carrier comprising a code track disposed concentrically to a center point of said graduation carrier;
a first scanning unit comprising a first interface;
a second scanning unit comprising a second interface, wherein said first scanning unit and said second scanning unit ascertain angle values of said graduation carrier by scanning said code track; and
a control unit comprising:
a device interface that is in communication with a follower electronics unit;
a control unit interface that is in communication with said first interface and said second interface; and
a processing unit by which, via said control unit interface and a request for angle values, angle values of said first scanning unit and said second scanning unit can be requested and processed into a corrected angle value, and said corrected angle value can be transmitted to said follower electronics unit via said device interface;
wherein the method further comprises:
requesting, via a request of angle values, angle values from said first scanning unit and said second scanning unit;
processing, via said processing unit, said angle values into said corrected angle value; and
transmitting said corrected angle value to said follower electronics unit.

11. The method according to claim 10, wherein said requesting angle values is initiated by a positioning request command, which arrives at said device interface from said follower electronics unit 12. The method according to claim 10, wherein said requesting angle values is controlled by a clock generator.

13. The method according to claim 12, further comprising:
measuring a time between a most recent request of angle values until arrival of a positioning request command at said device interface;
calculating extrapolated angle values from said angle values and said time measured; and
processing said extrapolated angle values into said corrected angle value.

14. The method according to claim 11, further comprising:
ascertaining from said angle values a correction value for correcting an angle value of said first scanning unit into said corrected angle value; and
calculating said corrected angle value.

15. The method according to claim 12, wherein:
ascertaining from said angle values a correction value for correcting an angle value of said first scanning unit into said corrected angle value; and
calculating said corrected angle value.

16. The method according to claim 13, wherein for ascertaining said correction value, angle values which have already been requested before arrival of said positioning request command are used.

17. The method according to claim 10, wherein said request of angle values and said processing of the angle values into said corrected angle value is effected in a correction unit and controlled by a trigger unit, which to that end sends a trigger signal to said correction unit even before arrival of a positioning request command.

\* \* \* \* \*